(12) United States Patent
Cheng

(10) Patent No.: US 6,295,667 B1
(45) Date of Patent: Oct. 2, 2001

(54) LOWER FRAME STRUCTURE OF A FOLDABLE PLAYYARD

(76) Inventor: Kenny Cheng, No. 16, Lane 47, Chih Peng St., Taipei (TW)

( * ) Notice: Subject to any disclaimer, the term of this patent is extended or adjusted under 35 U.S.C. 154(b) by 0 days.

(21) Appl. No.: 09/631,272

(22) Filed: Aug. 2, 2000

(51) Int. Cl.[7] .................................................. A47D 7/00
(52) U.S. Cl. .................................................................. 5/99.1
(58) Field of Search ............................. 5/99.1, 98.1, 93.1

(56) References Cited

U.S. PATENT DOCUMENTS

| | | | |
|---|---|---|---|
| 5,279,006 | * | 1/1994 | Teng ......................................... 5/99.1 |
| 5,339,470 | * | 8/1994 | Shamie ..................................... 5/99.1 |
| 5,465,439 | * | 11/1995 | Chien ....................................... 5/99.1 |
| 5,513,399 | * | 5/1996 | Weng ....................................... 5/99.1 |
| 5,697,111 | * | 12/1997 | Dillner et al. ........................... 5/93.1 |
| 5,819,342 | * | 10/1998 | Williams ................................. 5/99.1 |
| 6,170,099 | * | 1/2001 | Cheng ..................................... 5/99.1 |

* cited by examiner

Primary Examiner—Alexander Grosz
(74) Attorney, Agent, or Firm—Flehr Hohbach Test Albritton & Herbert LLP

(57) ABSTRACT

A lower frame structure of a foldable playyard comprises a hub being operable to lock the lower frame structure at an erected state and to unlock the lower frame structure to allow it to collapse to a collapsed state; four hub legs, one end portion of each of the hub legs being pivotally coupled to the hub such that the hub legs is capable of pivotal in a longitudinal direction of the hub between a erected position and a collapsed position; and a first L-shaped auxiliary supporting tube pivotally coupled to a first hub leg at a coupling end thereof and a second auxiliary supporting tube pivotally coupled to a third hub leg at a coupling end thereof and arranged such that the auxiliary supporting tubes may pivot in a direction parallel to the axial direction of the hub leg, whereby as the lower frame structure is extended to an erected state the hub legs and the first and second auxiliary supporting tubes form a substantially horizontal co-planar spread-out configuration with a leg portion of each of the auxiliary supporting tubes standing on the floor, and as the lower frame structure is collapsed to a collapsed state the hub legs and the auxiliary supporting tubes being substantially parallel with each other.

2 Claims, 6 Drawing Sheets

LOWER FRAME STRUCTURE OF A FOLDABLE PLAYYARD

FIELD OF THE INVENTION

The present invention relates generally to a foldable playyard and more particularly, to an improved lower frame structure of a foldable playyard.

BACKGROUND OF THE INVENTION

An easily transportable playyard of a simplified structure having upper and lower frame structure and a hub system, which is easily erectable and collapsible without re-assembly or disassembly of any parts is described in U.S. Pat. No. 5,819,342, the entire disclosures of which are incorporated herein by reference.

In the '342 patent, the lower frame assembly includes a hub, a plurality of corner leg connecting members and a plurality of hub legs, one end portion of each hub legs is pivotally coupled to the hub and the other end of each of the hub legs is pivotally coupled to one of the corner leg connecting members. The hub includes a hub body for pivotally coupling to one end portion of at least one leg, a locking member on the hub body, an engaging portion on at least one leg and adjacent to the locking member for cooperating with the locking member. FIG. 2 in the '342 patent depicts that the hub system is composed of a number of complicated configuration components and thus has a relatively high manufacturing cost. In addition, the bottom of the playyard disclosed in the '342 patent is supported only by the hub legs which are unable to provide sufficient support to the bottom of the playyard.

SUMMARY OF THE INVENTION

Accordingly, the present invention is directed to a lower frame structure of a foldable playyard and improved hub system that can substantially obviate one or more problems associated with prior art foldable playyards.

One object of the present invention is the provision of a lower frame structure of a foldable playyard which can provide a sufficient support at the bottom thereof.

Another object of the present application is the provision of an improved hub system of a lower frame structure of a foldable playyard which is easy to operate, is compact in structure, and has low manufacturing cost.

Additional features and advantages of the invention will be set forth in the description which follows, and in part will be apparent from the description, or may be learned by practice of the invention. The objectives and advantages of the invention will be realized and attained by the structure particularly pointed out in the written description and claims hereof as well as the appended drawings.

To achieve these and other advantages and according to the purpose of the present invention, as embodied and broadly described, the lower frame structure of a foldable playyard includes a hub which is operable to lock the lower frame structure at an erected state and to unlock the lower frame structure to allow it to collapse to a collapsed state; four hub legs, one end portion of each of the hub legs being pivotally coupled to the hub such that the hub legs can pivot in a vertical direction from a erected position to a collapsed position; a first L-shaped auxiliary supporting tube pivotally coupled to a first hub leg at a coupling end thereof and a second auxiliary supporting tube pivotally coupled to a third hub leg at a coupling end thereof and arranged such that the auxiliary supporting tubes may pivot in a direction parallel to the axial direction of the hub leg, whereby as the lower frame structure is extended to an erected state, the hub legs and the first and second auxiliary supporting tubes form a substantially horizontal co-planar spread-out configuration with a leg portion of each of the auxiliary supporting tubes standing on the floor. As the lower frame structure is collapsed to a collapsed state, the hub legs and the auxiliary supporting tubes being substantially parallel with each other.

The hub includes a hollow hub body, four coupling portions non-axially extending outwardly from an outer periphery of a upper portion the hub body, and locking means rotatably coupled to the hub body for operably cooperating with the coupling portions to lock the hub legs in the erected position, wherein each coupling portion has a reversed U-shaped cross-section with an elongated slot formed in each two side walls of the coupling portion and an opening formed in a top wall of the coupling portion.

The locking means comprises a bias spring disposed in hub body, a latch member rotatably coupled to the hub body and arranged such that it is biased toward a lock position by the bias spring, wherein the latch member has two substantially L-shaped arms formed at two substantially positions of a lower face of a periphery portion thereof. Each of the L-shaped arm has a vertical portion and a horizontal portion which will be inserted into the slots of corresponding coupling portion of the hub body as the latch member is biased toward the lock position by the bias spring to lock the hub legs in the erected position. A knob is coupled to the latch member to turn the latch member toward an unlock position such that the horizontal portion of the L-shaped arm is withdrawn from the slot and the hub legs may pivot from the erected position to the collapsed position.

In an embodiment of the present invention, each of the auxiliary supporting tubes is respectively attached to a bottom of the playyard by a cloth strap and arranged such that the auxiliary supporting tubes may be pulled to the supporting position while the playyard is erected by the hub legs.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principle of the invention. In the drawings.

DETAILED DESCRIPTION OF THE INVENTION

Figure 1:
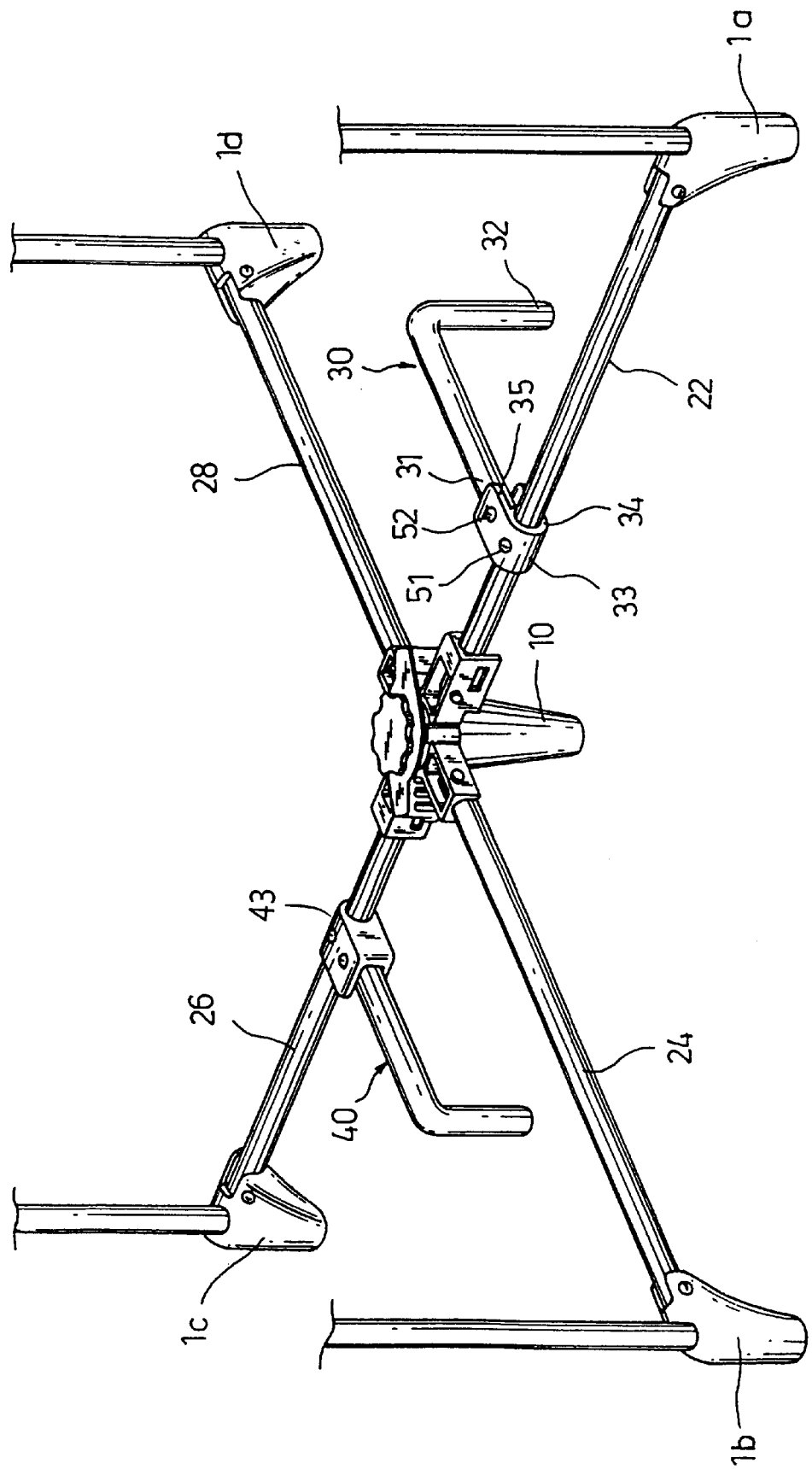
FIG. 1 is a perspective view illustrating a lower frame structure according to the present invention in a erected state.

Referring now to FIG. 1, a lower frame structure of a foldable playyard according to the present invention includes a hub 10, a first hub leg 22, a second hub leg 24, a third hub leg 26, a forth hub leg 28, a first auxiliary supporting tube 30 and a second auxiliary supporting tube 40.

Figure 2:
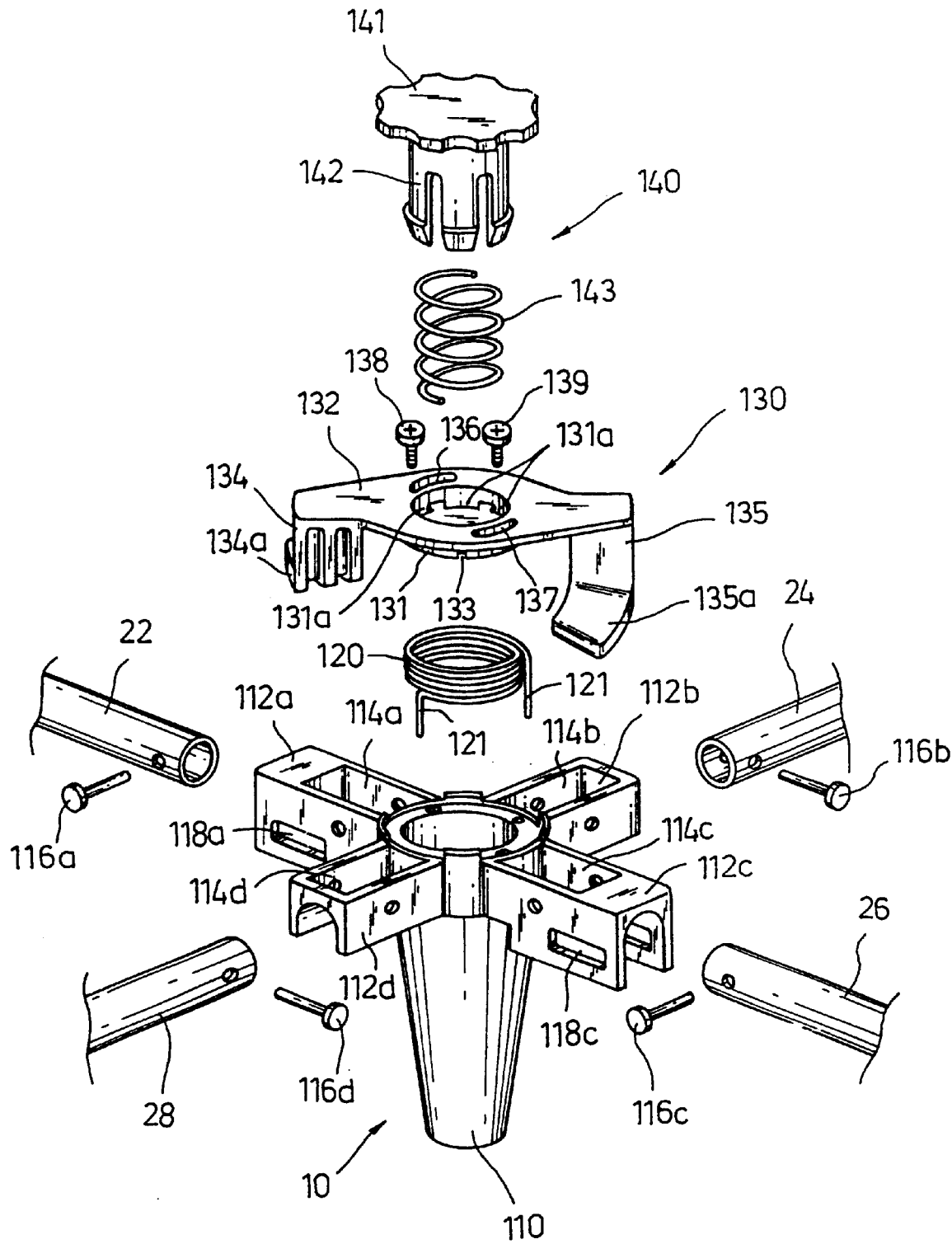
FIG. 2 is an exploded perspective view of the hub according to the present invention.

FIG. 2 illustrates an exploded perspective view of an embodiment of the hub 10 according to the present invention. The hub 10 includes a substantially hollow cylindrical-body 110, a bias spring 120, a locking unit 130 and a knob 140. The hollow cylindrical hub body 110 includes four coupling portions 112a, 112b, 112c, and 112d spaced-apart from each other and non-axially extending outwardly from an outer periphery of a upper portion the hub body 110 for receiving a first end of the hub legs 22, 24, 26, and 28 therein respectively. Each of the coupling portions has a substantially reversed U-shaped cross-section. The first end of the hub legs 22, 24, 26, and 28 is pivotally coupled to the coupling portions 112a–112d by a screw (e.g., 116a, 116b, 116c, 116d). An opening 114a, 114b, 114c and 114d is formed in an upper wall of the coupling portions 112a–112d respectively to avoid interfering with the first end of the hub legs while the hub legs are pivoting relative to the coupling portions such that each of the hub legs can pivot in a direction parallel to a longitudinal direction (vertical direction) of the hub body. Further, an elongated slot 118a, and 118c is formed in the side walls of the coupling portions 112a and 112c respectively and is arranged such that a distance from an upper edge of the slot to the upper wall of the coupling portion is greater than a diameter of the hub leg.

The bias spring 120 is a coil spring with two ends 121 thereof being bent vertically downward. The bias spring 120 is attached to the hub body 110 by inserting ends 121 into corresponding holes formed in an upper face of the wall of the hub body 110.

Locking unit 130 includes a cylindrical cup shaped body 131 sized to be received in the hub body 110. There are four openings 131a formed in a bottom wall of the body 131 and an elliptical flange 132 formed at a periphery of a top portion of the body 131 such that the locking unit 130 can rest upon the top of the hub body 110. A slot 133 is formed in a lower end of a side wall of the body 131 so as to cooperate with the bias spring 120 to urge the locking unit 130 toward a locking position. L shaped latch members 134, 135 are downwardly formed at a lowerface of each of two long axis ends of the elliptical flange 132. Latch members 134, 135 are arranged such that a horizontal portion 134a and 135a of the latch members 134, 135 may extend through the slots 118a and 118c of the coupling portions 112a and 112c as the locking unit 130 is urged to rotate toward the lock position by the bias spring 120 to lock the hub legs 22 and 26 at the erected horizontal position. There are two arcuate slots 136, 137 formed at positions adjacent to the top end of the body 131 such that bolts 138 and 139 may pass therethrough to rotatably fix the lacking unit 130 to the hub body 110.

The knob 140 has a knob head 141 and four legs 142 extending downwardly from a bottom of the knob head 141 with each of the legs 142 having a hook-shaped distal end. The knob 140 is coupled to the locking unit 130 by inserting the four legs 142 into~the four openings 131a of the body 131 and is prevented from being removed from the locking unit 130 by the hook-shaped distal end of the leg. In the embodiment shown in FIG. 2, a spring 143 is provided between the knob 140 and the locking unit 130 to facilitate the operation of the knob 140.

The first end of the hub legs 22, 24, 26, and 28 is pivotally coupled to the hub 10 as described above, and a second end thereof is pivotally coupled to legs 1a, 1b, 1c and 1d of the playyard as shown in FIG. 1. Techniques for pivotally coupling are known in the art and are described in the above mentioned U.S. Pat. No. 5,819,342 and thus will not be repeated herein.

As shown in FIG. 1, the first auxiliary supporting tube 30 is coupled to the first hub leg 22 and the second auxiliary supporting tube 40 is coupled to the third hub 26. The first and second auxiliary supporting tubes 30 and 40 have the same structure and thus the first auxiliary supporting unit 30 is used to explain the detail of the auxiliary supporting unites. As illustrated in FIG. 1, the first auxiliary supporting tube 30 is a substantially L-shaped tube having a coupling end 31 pivotally coupled to the hub leg 22 via a first coupling member 33 and a leg portion 32. The first coupling member 33 has a hollow tube-shaped body that can receive the hub leg 22 passing therethrough and be affixed to the hub leg 22 by a screw 51. The first coupling member 33 further has an arm portion 35 with a substantially U-shaped cross-section laterally extending away from an outer periphery of the tube-shaped body. The coupling end 31 of the first auxiliary supporting tube 30 is pivotally coupled to the arm portion 35 of the first~coupling member 33 such that the first auxiliary supporting tube 30 may pivot in a direction parallel to the axial direction of the hub leg 22. As shown in FIG. 1, the second auxiliary supporting tube 40 is pivotally coupled to the hub leg 26 via a second coupling member 43 in a way the same as that of the first auxiliary supporting tube 30. In a preferred embodiment shown in FIG. 3, the first and second auxiliary supporting tubes 30 and 40 are attached to a bottom C of the playyard by cloth straps A and B respectively.

Figure 4A:
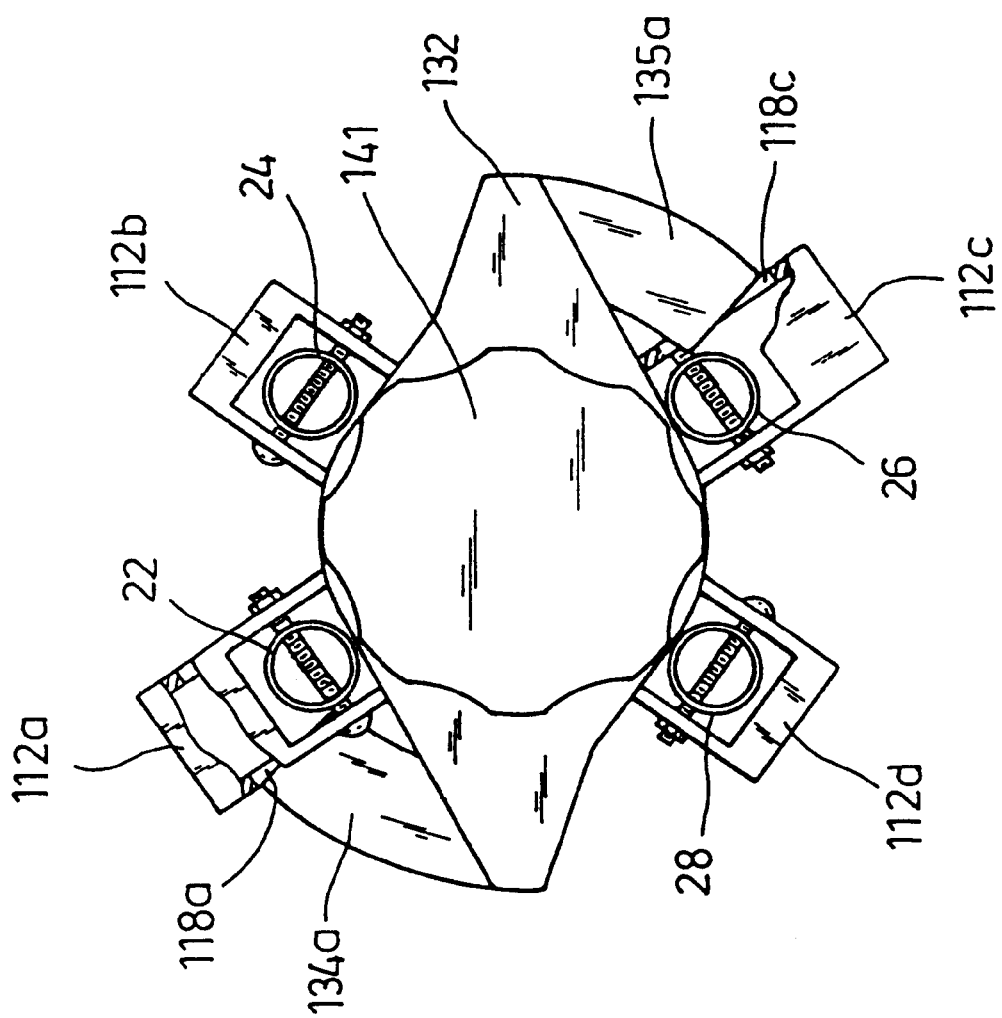
FIG. 4A is a partial cross-sectional top plane view illustrating the relationship between the latch member of the locking means and the coupling portion of the hub while the lower frame structure in a collapsed state.

In use, when the lower frame structure is to be packed from an erected state shown in FIG. 1, the knob 140 is manually rotated to cause the horizontal portions 134a and 135a of the latch members 134 and 135 to retract slots 118a and 118c of the coupling portions 112a and 112c. This unlocks the hub legs and the hub 10 may be lifted. Hub legs 22, 24, 26 and 28 may now pivot downward due to their own weight. First and second auxiliary supporting tubes 30 and 40 can pivot due to their own weight to a collapsed position at which the auxiliary supporting tubes are parallel with the hub legs. As shown in FIG. 4A, while in this collapsed state, the horizontal portions 134a and 135a of the latch members 134 and 135 are unable to extend into- the slots 118a and 118c of the coupling portions 112a and 112c. Note that locking unit 130 is urged by the bias spring 120 because the slots 118a, 118c are 5 blocked by hub legs 22 and 26.

Figure 3:
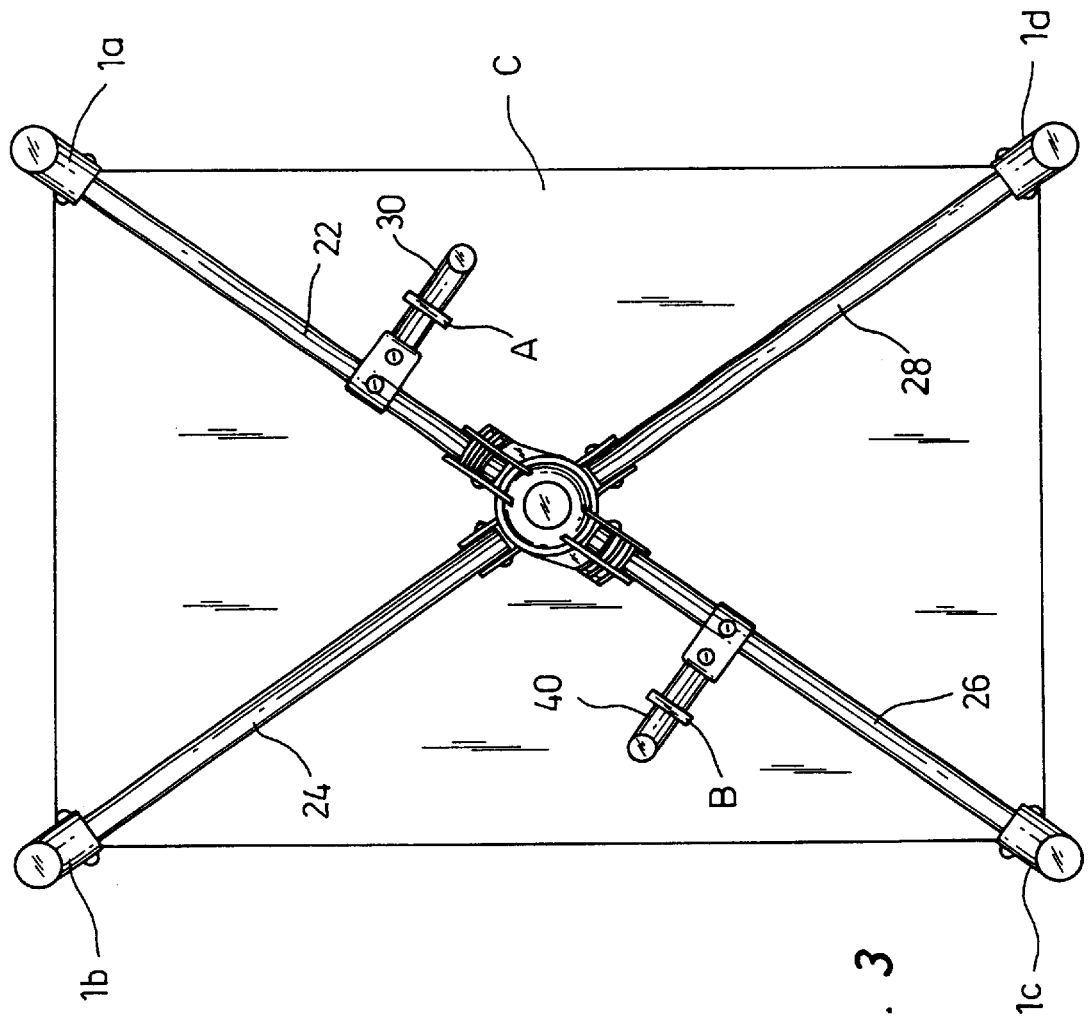
FIG. 3 is a bottom view of the lower frame structure according to an embodiment of the present invention with the auxiliary supporting tubes being attached to a bottom of the playyard via cloth straps.
Figure 4B:
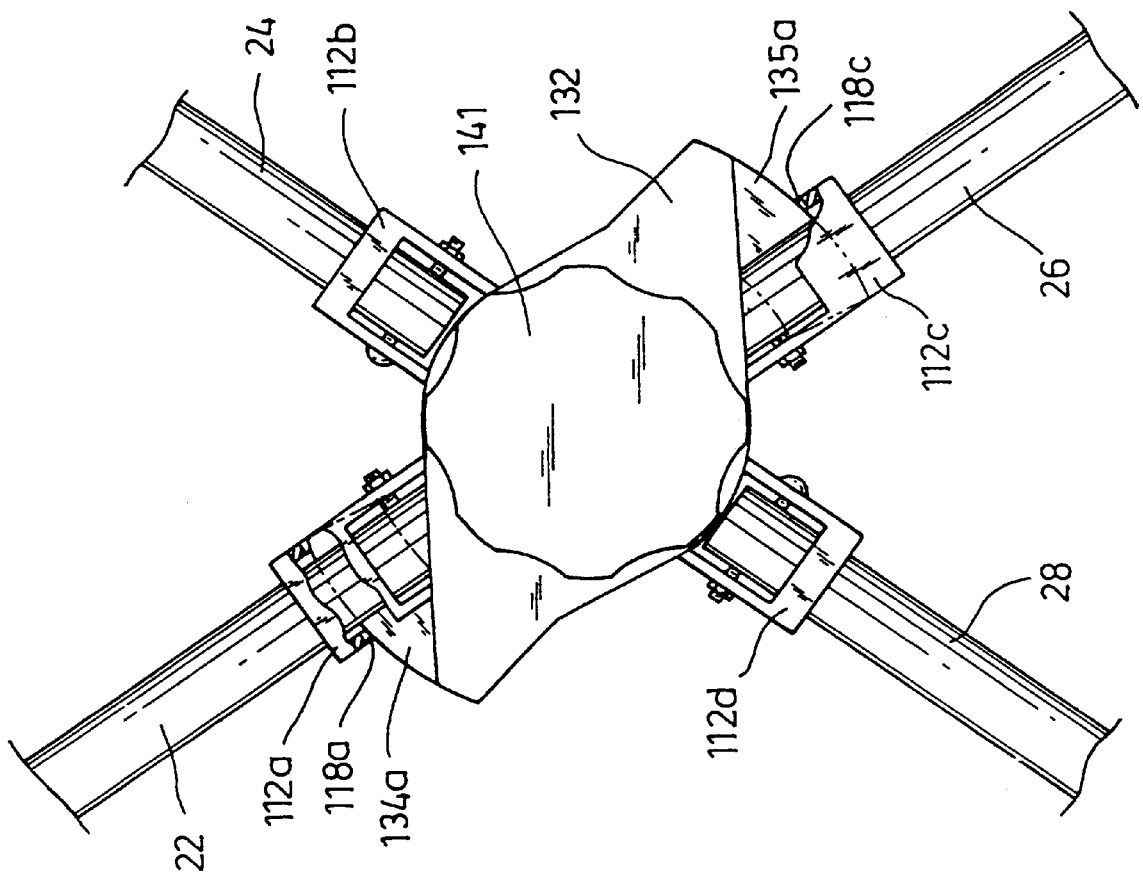
FIG. 4B is a partial cross-sectional top plane view illustrating the relationship between the latch member of the locking means and the coupling portion of the hub while the lower frame structure in a erected state.
Figure 5:
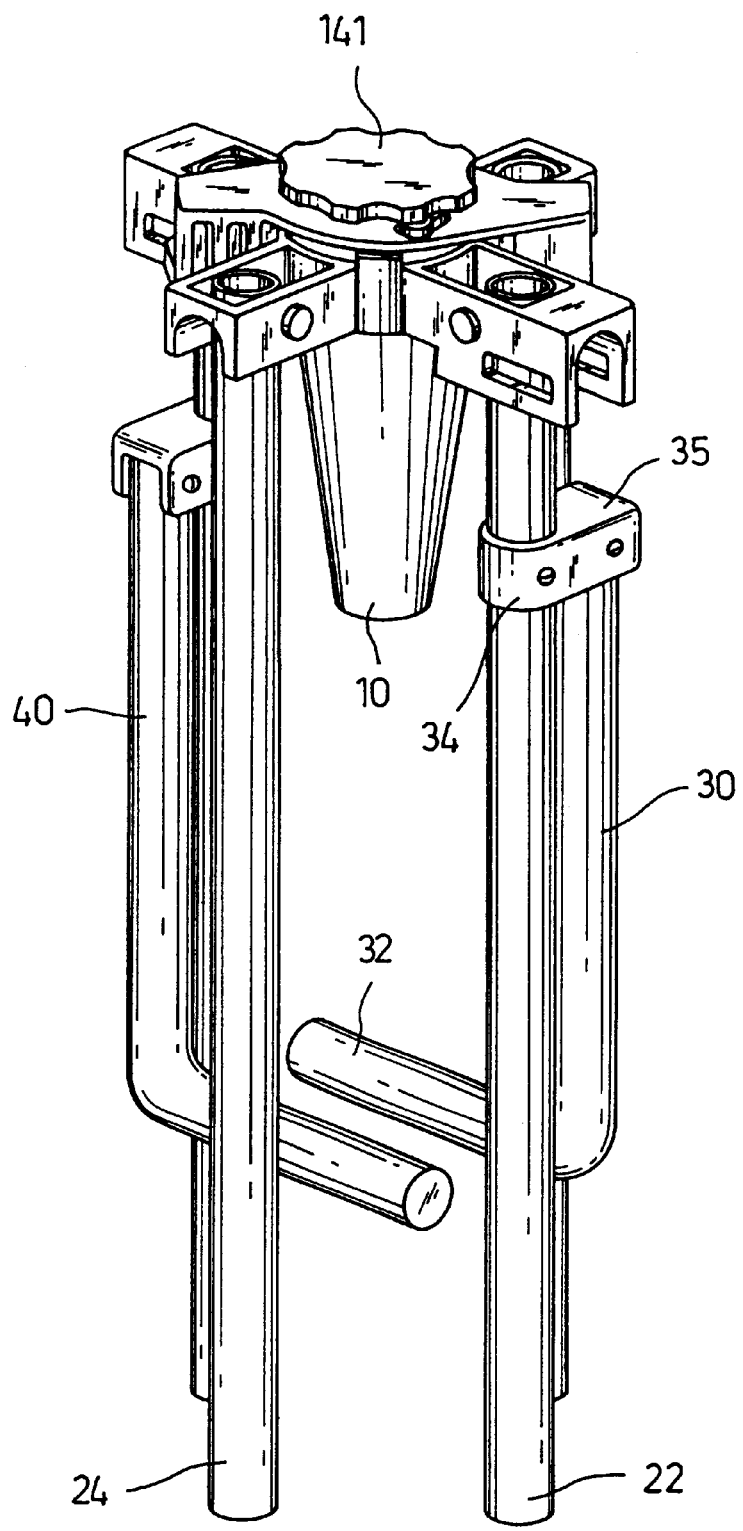
FIG. 5 is a perspective view illustrating the lower frame structure of FIG. 1 in a collapsed state.

When the lower frame structure is to be unpacked for use, the hub 10 is pressed down to cause the hub legs 22, 24, 26, 28 to pivot upward to a horizontal position. This will extend the bottom of the playyard, which extension will pull the first and the second auxiliary supporting tubes 30 and 40 to the support position as shown in FIG. 3. When the hub legs 22 and 26 pivot to the horizontal position, the horizontal portions 134a and 135a of the latch members 134 and 135 will be inserted into the slots 118a and 118c to support the hub legs 22 and 26 because of the biasing force exerted by the bias spring 120. This action will hold the hub legs at the horizontal erected position as shown in FIG. 4B. In this state, the 15 hub legs and the auxiliary supporting tubes form a substantially horizontal co-planer configuration as shown in FIG. 1.

This invention has been disclosed in terms of specific embodiments. It will be apparent that many modifications can be made to the disclosed structures without departing from the invention. Therefore, it is the intent of the appended claims to 20 cover all such variations and modifications as come within the true spirit and scope of this invention.

What is claimed is:

1. A lower frame structure of a foldable playyard comprising:

a hub comprising a hollow hub body, four coupling portions, each defining a U-shaped cross-section with spaced-apart sidewalls and defining an elongated slot in said sidewalls, said coupling portions extending non-axially outwardly from an outer periphery of an upper portion of said hub body, and means, cooperating with said coupling portions, for locking said structure in an erected state and for permitting collapsing of said structure into a collapsed state;

wherein said means for locking includes a latch member rotatably coupled to said hub body, and a bias spring disposed in said hub body to bias said latch member toward a lock position, said latch member having an L-shape that includes a horizontal arm portion that in a lock position engages with an elongated said slot in a said coupling portion;

four hub legs, an end portion of each of said hub legs pivotally coupled to said hub such that each leg is pivotable in a longitudinal direction of said hub between an erected position and a collapsed position;

a first auxiliary supporting tube pivotally coupled to a first of said hub legs and pivotable in a direction parallel to an axial direction of the first hub leg; and a second auxiliary supporting tube pivotally coupled to a third of said hub legs and pivotable in a direction parallel to an axial direction of the third hub leg;

wherein when said lower frame structure is extended to an erected state, said latch member locks said hub legs, and said hub legs and said first and said second auxiliary supporting tubes form a substantially horizontal coplanar structure permitting a leg portion of each auxiliary supporting tube to rest on a floor, and when said lower frame structure is collapsed to a collapsed state, said hub legs and said first and second auxiliary supporting tubes are substantially parallel with each other.

2. The structure of claim 1, further including a cloth strap attaching at least one said auxiliary supporting tube to a bottom of said playyard.

* * * * *